Nov. 27, 1962  R. L. UPHOFF  3,066,225
INDICATING CIRCUIT APPARATUS
Filed Sept. 4, 1959  2 Sheets-Sheet 1

INVENTOR
Russel L.Uphoff
BY
ATTORNEY

Nov. 27, 1962  R. L. UPHOFF  3,066,225
INDICATING CIRCUIT APPARATUS
Filed Sept. 4, 1959  2 Sheets-Sheet 2

INVENTOR
Russel L. Uphoff
BY
ATTORNEY

United States Patent Office 3,066,225
Patented Nov. 27, 1962

3,066,225
INDICATING CIRCUIT APPARATUS
Russel L. Uphoff, Murrysville, Pa., assignor to Jones & Laughlin Steel Corporation, Pittsburgh, Pa., a corporation of Pennsylvania
Filed Sept. 4, 1959, Ser. No. 838,136
8 Claims. (Cl. 250—219)

This invention relates to circuit apparatus for sensing the condition of a variable amplitude signal, and more particularly to circuit apparatus of the type described for producing an indicating output voltage in response to a voltage pulse of large amplitude superimposed upon a recurring square wave signal.

Although not limited thereto, the present invention is particularly adapted for use with an electronic inspection system of the type shown and described in copending application Serial No. 827,315, filed July 15, 1959, now Patent No. 3,020,033 and assigned to the assignee of the present application. In such a system a vidicon tube, for example, is employed to scan the image of an illuminated or irradiant body to detect defects on its surface. The body being inspected may be positioned on a conveyor; and as the vidicon scans its image, a substantially square wave signal or voltage pedestal is produced. Superimposed on the square wave signal are positive or negative short voltage pulses produced when the vidicon scans the image of defects which are lighter or darker, respectively, than the remainder of the body. The operation of the apparatus is such that the greater the light intensity of a defect, the greater the amplitude of a positive short pulse produced thereby; and, similarly, a defect which is particularly dark with respect to the remainder of the surface of the body will produce a very deep, negative pulse. In certain cases it is necessary or desirable to sense the presence of such deep, negative pulses since their existence indicates a particularly severe defect.

It is, accordingly, an object of this invention to provide apparatus for indicating the presence of voltage pulses of large amplitude superimposed upon a recurring square wave signal or the like.

Another object of the invention resides in the provision of circuit apparatus for producing an indicating voltage in response to an increase in the repetition rate at which a variable amplitude signal falls below a predetermined voltage level.

Still another object of the invention is to provide apparatus for producing an indicating voltage in response to a deep, negative pulse of the type described above regardless of the frequency of the square wave signal on which it is superimposed.

The above and other objects and features of the invention will become apparent from the following detailed description taken in connection with the accompanying drawings which form a part of this specification and in which.

Figure 1:
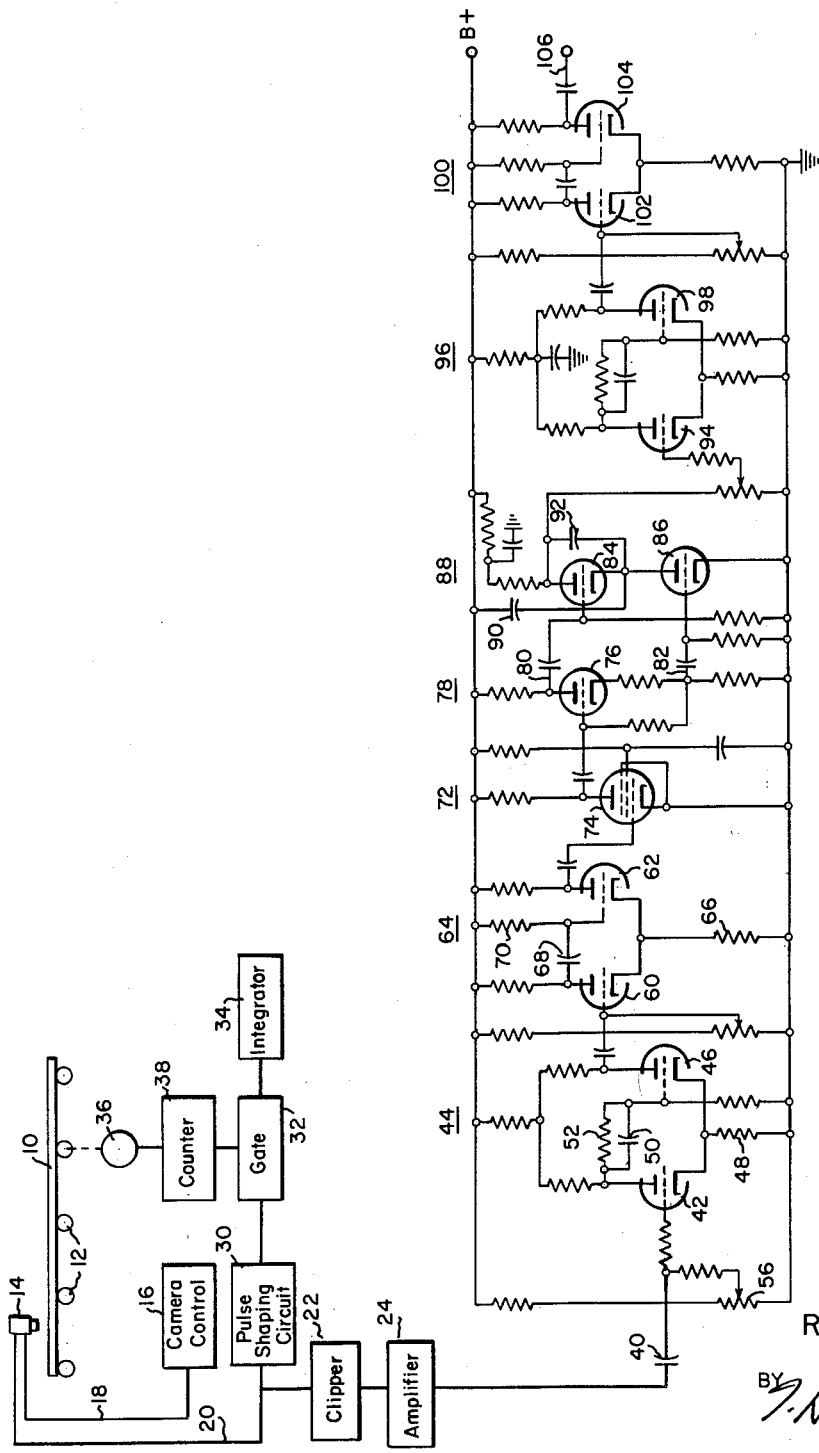
FIGURE 1 is a schematic illustration of one embodiment of the invention employing a constant frequency square wave signal having defect pulses superimposed thereon.

Referring to FIG. 1, an irradiant hot steel slab 10 is illustrated as passing over a series of conveyor rolls 12. Above the slab 10 is a vidicon tube 14 adapted to scan over a single fixed line which extends substantially perpendicular to the direction of movement of slab 10. The hot steel slab 10 is irradiant, meaning that it glows or gives off light. Furthermore, defects on the surface of the slab appear brighter or darker with respect to the remainder of the surface. Protrusions appear darker since they are cooler than the remainder of the surface, whereas holes or indentations appear brighter since they are hotter. As the electron beam of the vidicon 14 scans across the image of slab 10, a relatively long square wave pulse or voltage pedestal is produced. Superimposed on this pedestal are positive or negative short pulses which arise when the electron beam scans over the image of a defect, the width of each pulse being proportional to the width of the defect it represents. In this manner, a positive pulse is produced when the beam scans over a defect image such as a hole having a greater light intensity than the remainder of the surface, while a negative pulse is produced by a defect image such as a seam having a lower light intensity. Although the embodiment of the invention shown herein is illustrated in connection with a vidicon tube which scans the image of a hot steel slab, it is to be understood that it is illustrative of only one of many means which produces a variable amplitude signal. It is the variable amplitude signal, rather than the means for producing it, which is material to the present invention.

The vidicon 14 is controlled by a camera control circuit 16 which produces a sawtooth wave form on lead 18 to cause the electron beam of the vidicon to sweep across the width of slab 10 at a constant frequency. The output of vidicon 14, being a series of square wave voltage pulses or pedestals having defect pulses superimposed thereon, is fed through lead 20 to a clipper 22 and amplifier 24. The output of amplifier 24 then appears as wave form A shown in FIG. 2. As the electron beam of vidicon 14 sweeps from one side of the conveyor to the other, it will first scan the dark background portion of the conveyor until it reaches point $a$ in FIG. 2 which is the edge of the irradiant slab 10. After intersecting the edge of the slab, the voltage of the video wave form increases as shown because of the greater light intensity of the slab. At point $b$ the electron beam intersects a defect having a greater light intensity than the remainder of the slab. Consequently, a positive pulse 26 is produced in the wave form A of FIG. 2. At point $c$ the electron beam again intersects a defect, but in this case the defect has a lesser light intensity than the remainder of the slab; and, therefore, a negative short pulse 28 is produced in the wave form. Finally, at point $d$ in the wave form the electron beam leaves the edge of the slab, and the voltage decreases due to the dark background of the conveyor.

Referring again to FIG. 1, it will be noted that the video wave form on lead 20 is also passed to a pulse shaping circuit 30 which eliminates all but the positive and negative defect pulses. Thus, the output of pulse shaping circuit 30 appears as a wave form B in FIG. 2 where only the defect pulses 26 and 28 remain. It is desired to integrate the widths of the defect pulses in the wave form B to determine the total defect area over a given length of the slab 10. Since, however, the electron beam of vidicon 14 sweeps across the image of slab 10 at a constant frequency, the total number of defect pulses appearing at the output of pulse shaping circuit 30 for any given length of the slab 10 will be a function of the slab speed. That is, if the slab should slow down the total number of defect pulses at the output of the pulse shaping circuit 30 will be higher for a given length than it would be if the slab were traveling at a greater rate of speed. Consequently, a gating circuit 32 is provided in the system for passing only a predetermined proportion of the scanning information to an integrator 34, the proportion fed to the integrator being controlled linearly by the speed of the slab 10. In this regard, a tachometer 36 is provided which is connected to one of the rolls of conveyor 12 to produce an alternating current output signal having a frequency proportional to the speed of the slab 10. This output signal is fed to a counter 38 which will enable gate 32 to pass a number of the defect pulses to integrator 34 which is proportional to the speed of the slab. In this manner, the number of defect pulses reaching integrator 34 for any given length of slab 10 will always be the same regardless of the speed of the slab, and the output of the integrator will be a true indication of defect area. The detailed operation of circuits 30, 32, 34 and 38 may be determined by reference to the aforesaid copending application Serial No. 827,315, filed July 15, 1959.

In addition to integrating the total defect area over a given length of slab 10, it is also desired to detect the presence of deep, negative defect pulses in the output of vidicon 14. Such deep, negative defect pulses may appear, for example, as pulses 28′ in wave form C shown in FIG. 2. In accordance with this invention, circuitry is provided which will produce an indicating voltage whenever a deep, negative defect pulse, such as pulse 28′, falls below a predetermined voltage level.

Figure 2:
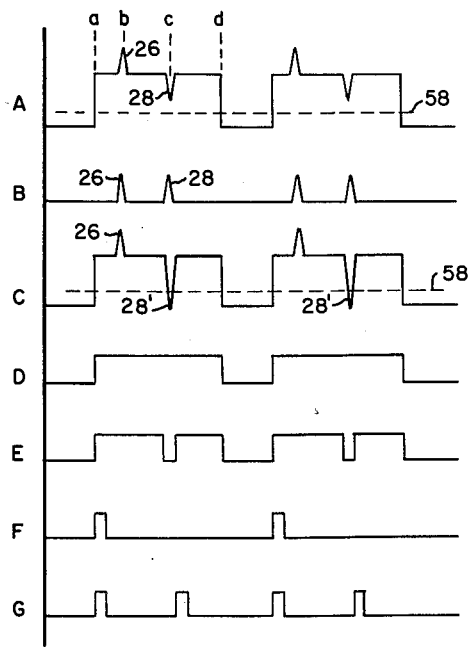
FIG. 2 illustrates various wave forms produced by the circuitry shown in FIG. 1.

Referring now to FIG. 1, the output of amplifier 24 appearing as the wave form A or C in FIG. 2 is fed through a capacitor 40 to the grid of the first of two triode tubes 42 and 46 in a Schmitt trigger circuit 44. It will be noted that the cathodes of triodes 42 and 46 are connected to ground through a common resistor 48. In addition, the anode of triode 42 is connected to the grid of triode 46 through the parallel combination of capacitor 50 and resistor 52. Under normal conditions, triode 46 will conduct while triode 42 is cut off. The potentiometer 56 in the grid circuit of triode 42 is adjusted such that the triode will conduct whenever a signal having a voltage amplitude above level 58 shown in wave forms A and C of FIG. 2 is applied to its grid. When triode 42 conducts in response to a signal having an amplitude above the voltage level 58, triode 46 will cut off because of the fall in the plate voltage of triode 42 which is coupled to the grid of triode 46 through elements 50 and 52. Triode 42 will continue to conduct until the amplitude of the pulse in the wave form applied to its grid falls below the aforesaid voltage level 58, at which time it will cut off and triode 46 will again conduct.

Referring to FIG. 2, it can be seen that if wave form A with no deep, negative pulses therein is applied to the grid of triode 42, the amplitude of the signal between points $a$ and $d$ will always be above voltage level 58. Consequently, the output appearing at the plate of triode 46 will be wave form D. If, however, the wave form C is applied to the grid of triode 42 with a deep, negative defect pulse 28′ therein, the amplitude of the signal will fall below the threshold voltage level 58 when the deep, negative defect pulse 28′ is reached so that the resulting signal at the plate of triode 46 will appear as the wave form E in FIG. 2. It will be noted that in this manner the frequency of the square wave signal has effectively doubled.

The output of Schmitt trigger circuit 44 on the plate of triode 46 is applied to the grid of one of two triodes 60 and 62 in a one-shot multivibrator circuit 64. The cathodes of both of the triodes 60 and 62 in the multivibrator circuit 64 are connected to ground through a common resistor 66 in a manner similar to that of the Schmitt trigger circuit alrady described. In this case, however, the anode of triode 60 is connected to the grid of triode 62 through a single capacitor 68 having one of its terminals connected to a B+ voltage source through resistor 70. Under normal conditions, triode 62 will conduct while triode 60 is cut off. When, however, the positive voltage pulses of wave form D or E are applied to the grid of triode 60, it will conduct. The resultant fall in the plate voltage of triode 60 is coupled through capacitor 68 to the grid of triode 62 whereby this latter triode will cut off. After a predetermined period of time, the charge on capacitor 68 will leak off through resistor 70 so that the voltage on the grid of triode 62 will rise to initiate conduction. The output of the one-shot multivibrator, therefore, will be a series of short voltage pulses of fixed pulse width which occur each time conduction is initiated in triode 60. Thus, if no deep, negative defects are present in the wave form at the output of amplifier 24, the wave form F of FIG. 2 will appear at the output of multivibrator 64 wherein a single pulse is produced for each time period between points $a$ and $d$. If, however, a deep, negative defect 28′ appears as in wave form C, then two short pulses will appear at the output of the multivibrator 64 as wave form G in FIG. 2 during the time interval between points $a$ and $d$.

Coupled to multivibrator 64 is an amplifier 72 which comprises a pentode 74 having an input signal applied to its control grid. The output of pentode 74 is then applied to the grid of triode 76 in phase inverter 78. It should be noted here that the output of the phase inverter 78 is divided into two channels. That is, a signal is taken on leads 80 and 82 from both the plate and the cathode of triode 76. The respective pulses on these leads are then applied to the grids of triodes 84 and 86 in integrator 88. With no input pulses applied to either triode 84 or 86, the triode 86 will be normally conducting while triode 84 will be normally cut off. Consequently, capacitor 90 will be charged through the triode 86. When a pulse from the amplifier 72 is applied to the triode 76 in phase inverter 78, however, a positive pulse will appear on lead 80, while a negative pulse will appear on lead 82. Consequently, triode 86 will cut off while triode 84 is rendered conducting to effectively short circuit the capacitor 90. Element 92 serves as a smoothing capacitor in the integrator.

If a deep, negative defect pulse 28′ does not appear in the wave form at the output of amplifier 24, the frequency with which the capacitor 90 periodically discharges will not be enough to raise the voltage on the grid of triode 94 in Schmitt trigger circuit 96 above its firing value. That is, the frequency of the pulses in wave form F at the output of multivibrator 64 will not be great enough to raise the voltage on capacitor 92 to actuate the Schmitt trigger circuit 96. If, however, the frequency of the pulses at the output of multivibrator 64 is doubled as shown in wave form G due to the presence of a deep, negative defect 28′, then the Schmitt trigger 96 will be actuated whereby its second triode 98 will produce a voltage to trigger a second one-shot multivibrator 100 having two triode tubes 102 and 104 therein. In this manner, when a positive pulse appears at the plate of triode 98 due to an increase in the voltage across capacitor 90 when the input frequency doubles, triode 102 will be rendered conducting and triode 104 will momentarily cut off to produce a positive output voltage pulse on lead 106 indicating the presence of a deep, negative defect such as pulse 28′ shown in wave form C of FIG. 2.

Figure 3:
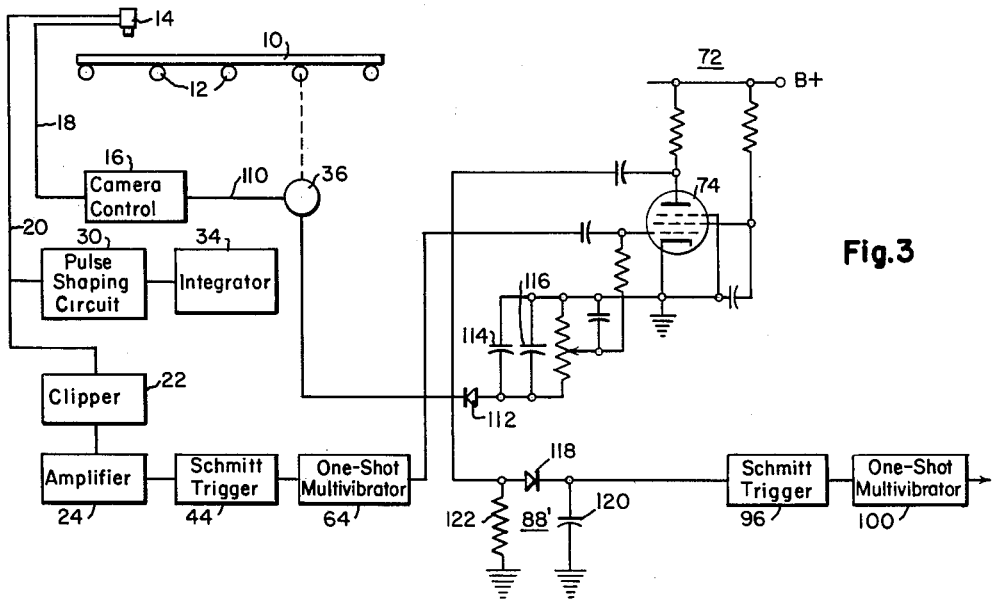
FIG. 3 is a schematic illustration of another embodiment of the invention in which the square wave signal having defect pulses superimposed thereon is of variable frequency.

Another embodiment of the invention is shown in FIG. 3 wherein the sweep repetition rate of the scanning vidicon tube is variable to compensate for variations in the speed of slab 10. Elements in FIG. 3 which correspond to elements shown in FIG. 1 are identified by like reference numerals. Thus, in the case of FIG. 3, the output of tachometer generator 36 is applied to camera control circuit 16 through lead 110 whereby the frequency at which the electron beam of vidicon 14 scans an image of the surface of slab 10 is made proportional to the speed of the slab. The output of the vidicon tube 14 on lead 20 in this case is again applied to the pulse shaping circuit 30; however, the output of the pulse shaping circuit is applied directly to integrator 34 without passing through a gate circuit since slab speed compensation has been achieved by regulating the sweep repetition rate of the vidicon.

It will be remembered that in the embodiment of the invention shown in FIG. 1, the integrator 88 produced an output voltage proportional to the frequency of the pulses applied to Schmitt trigger 44. Since the frequency of the pulses at the output of amplifier 24 in FIG. 3 is a function not only of the presence of a deep, negative defect but also the speed of the slab 10, the integrator employed in the embodiment of FIG. 1 could not distinguish an increase in frequency due to an increase in slab speed from an increase in frequency due to the presence of a deep, negative defect. Accordingly, the embodiment of FIG. 3 employs an integrator which is responsive to pulse area rather than frequency. The pulses fed to the integrator are automatically reduced in amplitude and area as slab speed increases so that, in the absence of a deep, negative defect, the total pulse area fed to the integrator is always the same for any given unit of time, and its output voltage does not rise. When, however, a deep, negative defect appears, the pulse area due to the deep, negative defect pulse is not compensated for by slab speed, and the output voltage of the integrator rises.

Referring now to the circuit diagram of FIG. 3, the video wave form appearing on lead 20 is applied through clipper 22 and amplifier 24 to Schmitt trigger circuit 44 as was the case in FIG. 1. The remainder of the circuitry is the same as that shown in FIG. 1, except that amplifier 72 now incorporates an automatic gain control circuit and phase inverter 78 and integrator 88 are now replaced by integrator 88'.

With reference to the automatic gain control circuit, the output of tachometer generator 36 is applied through a rectifier 112 and smoothing capacitors 114 and 116 to the control grid of pentode 74 in amplifier 72. In this manner, as the speed of slab 10 increases and the frequency output of the tachometer generator likewise increases, the gain of the amplifier is reduced. Furthermore, as the frequency of the pulses at the input to amplifier 72 increases in response to an increase in slab speed, the amplitude of the pulses at the output of the amplifier is decreased so that the total pulse area per unit of time fed to integrator 88' is always the same, assuming that no deep, negative defect pulses appear. When, however, a deep, negative defect pulse does appear, its added area is not compensated for by the automatic gain control circuit. Consequently, the total pulse area per unit of time fed to integrator 88' is increased.

As shown, integrator 88' comprises a diode 118 and capacitor 120 connected in series across a resistor 122. Diode 118 insures that the capacitor 120 will not discharge rapidly. That is, it will insure that the capacitor will not discharge materially between successive pulses even though the frequency of the pulses is decreased due to a decrease in slab speed. Remembering that the total pulse area per unit of time fed to the integrator is constant in the absence of a deep, negative defect pulse, the voltage on capacitor 120 will remain constant with no deep, negative defect pulses, and this voltage will not be great enough to actuate Schmitt trigger 96. When, however, a deep, negative defect pulse appears, the total pulse area per unit of time fed to the integrator increases, the voltage across capacitor 120 also increases, and circuits 96 and 100 are actuated to produce an output voltage indicating the presence of such deep, negative defect pulse.

Although the invention has been shown in connection with certain specific embodiments, it will be readily apparent to those skilled in the art that various changes in form and arrangement of parts may be made to suit requirements without departing from the spirit and scope of the invention. In this respect it will be apparent that the invention need not be employed with a square wave signal, but is equally applicable to any signal having a variable amplitude. Furthermore, although the foregoing description has been more or less confined to the case where a deep, negative pulse is superimposed upon positive voltage pedestals, the invention is also applicable to the case where a large positive pulse is superimposed upon negative voltage pedestals. In this latter case, the signal would be inverted in phase before it is applied to schmitt trigger 44 so that the operation of the circuit would be the same as that for the case of deep, negative pulses superimposed upon positive voltage pedestals.

I claim as my invention:

1. Circuit means for producing an indicating voltage in response to an increase in the frequency at which a variable amplitude input signal falls below a predetermined voltage level comprising, in combination, apparatus for producing a voltage pulse of short duration each time the input signal falls below said predetermined voltage level, a pair of signal channels, means for feeding the voltage pulses produced by said apparatus into said channels, means in one of said channels for inverting the voltage pulses therein, terminals adapted for connection to a source of driving potential, a pair of electron valves connected in series between said terminals, one of said valves being normally conducting and the other valve being normally nonconducting control electrodes for said electron valves, means for applying the voltage pulse in said one channel after it has been inverted to one of said control electrodes, means for applying the voltage pulse in the other of said channels to the other control electrode, a first capacitor connected between the junction of said series-connected electron valves and one of said terminals, a second capacitor connected in shunt with one of said electron valves and a device connected to said second capacitor for producing an indicating output voltage pulse when the voltage across said first capacitor exceeds a predetermined level.

2. Circuit apparatus for detecting the presence of voltage pulses of large amplitude superimposed upon the voltage pedestals of a substantially square wave signal of variable frequency comprising, in combination, apparatus for producing a voltage pulse of short duration each time the leading edge of a pulse or pedestal in said signal crosses a predetermined voltage level, a variable gain amplifier connected to the output of said apparatus, means for producing a direct current voltage proportional to the frequency of said square wave signal, means for applying said direct current voltage to said amplifier whereby the gain of the amplifier will be decreased as the direct current voltage increases, an integrator connected to the output of said amplifier for producing a voltage proportional to the total pulse area per unit of time at the output of said amplifier, and apparatus for producing an indicating voltage pulse whenever the voltage produced by said integrator rises above a predetermined level.

3. Circuit apparatus for detecting the presence of deep, negative pulses superimposed upon the voltage pedestals of a variable frequency square wave signal comprising, in combination, apparatus for producing a voltage pulse of short duration each time said signal falls below a predetermined amplitude, a variable gain amplifier connected to the output of said apparatus, means for producing a direct current voltage proportional to the frequency of said square wave signal, means for applying said direct current voltage to said amplifier whereby the gain of the amplifier will be decreased as the direct current voltage increases, an integrator connected to the output of said amplifier and including a unidirectional current device and a capacitor connected in series across the output terminals of the amplifier whereby the voltage on said capacitor will vary as a function of the total pulse area per unit of time at the output of said amplifier, and means for producing an indicating voltage pulse when the voltage across said capacitor exceeds a predetermined value.

4. Circuit apparatus for detecting the presence of voltage pulses of large amplitude superimposed upon the voltage pedestals of a square wave signal comprising, in combination, apparatus for producing a voltage pulse of short duration each time the leading edge of a pulse or pedestal in said signal crosses a predetermined voltage level, integrating means including a variable gain amplifier responsive to the output of said apparatus for producing a voltage which rises when the number of said voltage pulses of short duration increases during the time duration of a voltage pedestal in said square wave signal, and means for producing an indicating voltage pulse when the voltage produced by said integrating means exceeds a predetermined level.

5. Circuit means for producing an indicating voltage in response to an increase in the frequency at which a variable amplitude signal falls below a predetermined voltage level during a specified time interval comprising, in combination, apparatus for producing a voltage pulse of short duration each time the input signal falls below said predetermined voltage level, and integrating means including a variable gain amplifier responsive to the output of said apparatus for producing an indicating voltage in response to an increase in the number of said voltage pulses during said specified time interval.

6. Circut means for producing an indicating voltage in response to the presence of a voltage pulse of large amplitude superimposed upon the voltage pedestals of a square wave signal comprising, in combination, apparatus for producing a voltage pulse of short duration each time the leading edge of a pulse or pedestal in the input signal crosses a predetermined voltage level, a pair of series-connected electron valves each having a control electrode therein, one of said valves being normally conducting in the absence of a negative pulse applied to its control electrode and the other valve being normally nonconducting in the absence of a positive pulse applied to its control electrode, means for applying said voltage pulses of short duration to the control electrode of said normally conducting valve with negative polarity to cut off said normally conducting valve, means for applying said voltage pulses of short duration to the control electrode of said normally nonconducting valve with a positive polarity to initiate conduction therein, said voltage pulses of short duration as applied to the control electrodes of said valves being in phase and of the same pulse width, a capacitor connected in shunt with the normally nonconducting valve, and means for producing an indicating output voltage pulse when the voltage across said capacitor exceeds a predetermined level.

7. Circuit means for producing an indicating voltage in response to an increase in the frequency at which a variable amplitude input signal falls below a predetermined voltage level comprising, in combination, circuit means for producing a first train of voltage pulses in which a pulse occurs each time said input signal falls below said predetermined voltage level, circuit means connected to the output of said first-mentioned means for producing a second train of voltage pulses of constant pulse width, the pulses in said second train having a frequency proportional to the frequency at which said input signal falls below said predetermined voltage level, a pair of signal channels, means for applying said second train of voltage pulses to both of said signal channels, means in one of said channels for inverting the signals therein whereby the signals in one channel will have a positive polarity whereas the signals in the other channel will be of negative polarity, a pair of series-connected electron valves, a control electrode for each of said valves, one of said valves being normally nonconducting and the other valve being normally conducting, a capacitor connected in shunt with said normally nonconducting valve, means for applying the pulses in one of said channels having a negative polarity to the control electrode of said normally conducting valve, means for applying the pulses in the other of said channels having a positive polarity to the control electrode of the normally nonconducting valve, and circuit means coupled to said capacitor and operable to produce an indicating voltage when the voltage across said capacitor exceeds a predetermined value.

8. In combination with means including an electron-optics device for scanning an image of the surface of a moving body with an electron beam to produce a variable frequency square wave signal having short width pulses superimposed thereon, means for detecting the presence of deep, negative short width pulses superimposed upon the voltage pedestals of said variable frequency square wave signal comprising apparatus for producing a voltage pulse of short duration each time said variable frequency signal falls below a predetermined amplitude, a variable gain amplifier connected to the output of said apparatus, means including a tachometer generator operatively connected to said moving material and adapted to produce a direct current voltage proportional to the speed of said moving material, means for applying said direct current voltage to said variable gain amplifier whereby the gain of the amplifier will be decreased as the speed of the material and said direct current voltage increases, an integrator connected to the output of said amplifier and including a unidirectional current device and a capacitor connected in series across the output terminals of the amplifier whereby the voltage on said capacitor will vary as a function of the total pulse area per unit of time at the output of said amplifier, and means for producing an indicating voltage pulse when the voltage across said capacitor exceeds a predetermined value to indicate the existence of a deep, negative short width pulse superimposed upon said voltage pedestals.

References Cited in the file of this patent

UNITED STATES PATENTS

| | | |
|---|---|---|
| 2,527,342 | White | Oct. 24, 1950 |
| 2,570,233 | Harris | Oct. 9, 1951 |
| 2,589,807 | Higinbotham | Mar. 18, 1952 |
| 2,632,053 | Volz | Mar. 17, 1953 |
| 2,875,334 | Nashman et al. | Feb. 24, 1959 |